United States Patent [19]

Oefner et al.

[11] Patent Number: 4,774,117
[45] Date of Patent: Sep. 27, 1988

[54] BENDING LOAD BEAM

[75] Inventors: Walter Oefner, Otterfing, Fed. Rep. of Germany; Gerhard Singer, Zoetermeer, Netherlands

[73] Assignee: Messerschmitt-Bölkow-Blohm GmbH, Munich, Fed. Rep. of Germany

[21] Appl. No.: 34,773

[22] Filed: Apr. 3, 1987

[30] Foreign Application Priority Data

Apr. 11, 1986 [DE] Fed. Rep. of Germany ....... 3612176

[51] Int. Cl.$^4$ ............... B32B 3/12; B32B 5/12; B32B 7/04
[52] U.S. Cl. ................... 428/71; 428/109; 428/114; 428/119; 428/120; 428/188; 428/294; 428/316.6
[58] Field of Search ........... 428/71, 76, 316.6, 107, 428/109, 112, 113, 114, 119, 120, 167, 188, 294, 295

[56] References Cited

U.S. PATENT DOCUMENTS 4,177,306 12/1979 Schulz et al. .................. 428/120
4,464,429 8/1984 Michaud-Soret ............. 428/284
4,617,217 10/1986 Michaud-Soret ............. 428/316.6

Primary Examiner—William J. Van Balen
Attorney, Agent, or Firm—Kenyon & Kenyon

[57] ABSTRACT

In a bending load beam, in particular for the truck or bogie frames of rail vehicles, comprising a fiber composite structure relatively rigid at least in the center of the beam, elastic at the beam end sections, having an upper and a lower fiber cord fashioned as respective upper and lower flanges with the fiber oriented in the longitudinal direction of the beam and with a fiber composite core placed between the fiber cords to maintain their distance, the fiber composite core is composed of fiber composite load webs distributed lamellae-like over the width of the beam. The load webs are oriented in the longitudinal direction of the beam, form the boundaries of hollow chambers, and are bound into the upper and the lower fiber cords. The fibers of the load webs are oriented obliquely to the longitudinal direction of the beam, with which the demands of high torsion resistance, great flexural strength and a defined rigidity increasing from the relatively less rigid end sections toward the beam center are met in ways which do justice to the fiber composite material and save weight.

21 Claims, 3 Drawing Sheets

BENDING LOAD BEAM

BACKGROUND OF THE INVENTION

The present invention relates to a bending load beam, in particular for the bogie or truck frames of rail vehicles.

Rail vehicle truck or bogie frames of fiber sandwich construction are known (DE-PS No. 29 52 182), in which the longitudinal bending load beams connected by cross struts to each other, for carrying the wheeltrucks, in addition to the required carrying function, also assume the function of primary springs and must have a given strength and rigidity changing in the longitudinal direction and increasing from the relatively elastic longitudinal beam ends toward the beam center. Simultaneously, they must possess a high resistance to torsion.

Known fiber sandwich bending load beams, however, which in the manner of an I section with an upper and a lower flange with unidirectional fiber orientation and with a fiber composite load web placed between the flanges as a distance maintainer, have uniform bending strength and bending rigidity and a very low resistance to torsion. Such beams, furthermore, present the difficult problem of achieving sufficiently secure binding of the unidirectional reinforcement fibers with each other and with the load web, especially if high dynamic loads, localized in points, are introduced into the beam. Known are, furthermore, flexural springs of fiber composite, which consist either of a unidirectional fiber cord with fiber inserts embedded in it (DE-OS No. 31 19 856) or are formed multi-layered with an upper and a lower unidirectional flange and an interspaced fiber composite distance maintainino layer, provided with laterally projecting brackets for the application of load (DE-PS No. 32 38 099). Springs of this kind are, by their very nature, not suitable as bending resistant beams and have in comparison to the latter, relative to their bending and torsion resistance, great weight.

SUMMARY OF THE INVENTION

It is an object of the present invention to provide a bending load beam of fiber composite, which with optimum weight utilization and distribution of the material, achieves high torsion resistance and a specifiable bending strength variable in the longitudinal direction of the beam as well as high load safety.

The above and other objects of the present invention are achieved by a bending load beam, in particular for the truck frame of a rail vehicle, comprising a fiber composite structure, which is at least in the beam center relatively rigid and at the beam end sections elastic, having an upper and a lower fiber cord formed as upper and lower flanges, respectively, the fiber cords having a fiber direction which is unidirectional in the longitudinal direction of the beam and having a fiber composite core arranged between the fiber cords so as to maintain a distance between the fiber cords, the fiber composite core comprising fiber composite load webs distributed lamellae-like over the beam width, the load webs being oriented in the longitudinal beam direction and forming boundaries of hollow chambers, the load webs having fibers oriented obliquely to the longitudinal beam direction, marginal regions of the load webs ending in the upper and the lower fiber cords and being fastened in the fiber cords, the load web marginal regions being coupled to the fiber cords through an adhesive bond in the form of a foil adhesive elastic in the direction transverse to the load web.

According to another aspect of the present invention, the fiber cords have fabric strips inserted therein, the strips being parallel to each other and extending transverse to the load webs over the lengths of the fiber cords and between the load webs with the fibers of the strips oriented essentially perpendicular to the plane of the load webs.

According to a further aspect of the invention, the marginal regions of the load webs have longitudinal slots disposed centrally therein which are open on one end toward the web edge, thereby allowing yielding in the direction of the load web thickness.

With the beam according to the invention, because of the specific construction of the fiber composite core, a large area bonding of the load web arrangement to the upper and lower unidirectional fiber cords and an effective protection of these fiber cords against bursting open upon being loaded is ensured, and simultaneously the beam construction in the region between the upper and lower cord is structured in the manner of torsion boxes aligned next to each other and therefore torsion resistant to a high degree, with the special feature, that in the hollow chambers between the individual load webs, i.e. in the inside of the torsion boxes, local reinforcements for the introduction of point-loads can be provided. With the fiber composite beam according to the invention, the demands placed on strength and rigidity especially in high-speed truck frames of rail vehicles are fulfilled to the fullest extent and in a way which does justice to the fiber composite material, utilizes the weight optimally and is simple from the point of view of production techniques.

In a further advantageous embodiment of the invention, the hollow chambers are filled with a filler, in particular foamed material, by which the load resistance of the beam is markedly improved without significant increases in weight. Also for reasons of improved load characteristics, the load webs may preferentially have a quasi-isotropic fiber layer structure, i.e., they possess in all directions of the load web plane approximately similar strength and rigidity.

For particularly simple and load-safe force introduction, it is preferable to form the respective load introduction sites of the beam between the upper and the lower fiber cords on the load webs in such a way, that the load webs are locally reinforced with fiber composite inserts bridging the hollow chambers which are luted on the load web side. In view of the necessity of constructing the inserts sufficiently deformation-safe especially for fastening with studs, their fibers are oriented transverse to the longitudinal direction of the beam essentially perpendicular to the plane of the load webs.

In order to increase the torsion resistance of the beam further, the fiber cords and the load web arrangement are preferentially enclosed by a cover coat of fiber composite increasing the torsion resistance, which is applied to the outside of the beam and which has, in view of its stiffening effect aimed at torsion stress, a fiber orientation with respect to the longitudinal axis of the beam crossing at +45°.

To lend the beam in a very simple, weight-saving way a given elasticity changing in the longitudinal direction with a relatively high rigidity in the region of the beam center, the load web arrangement preferentially has a corresponding non-uniform height, which decreases toward the beam ends, while the upper and lower unidirectional fiber cord may have in the longitudinal direction of the beam, essentially a constant cross section, so that the bending stresses are nearly uniform over the entire length of the beam.

A further aspect of the invention, important in view of high load safety, consists in that in the unidirectional fiber cords fabric strips are placed, which are parallel to each other, extending transversely between the load webs over the length of the fiber cords, the fibers of the fabric strips being essentially oriented perpendicular to the plane of the load webs. Contraction of the resin matrix during the curing cycle, which occurs in the unidirectional fiber cords perpendicular to the load webs cured earlier and maintained at a distance through the foamed material filling, is in this way effectively prevented and a secure bond over a large area between the fiber cords and the load webs is ensured, which is of decisive importance for the transmission of load to and from the load webs. For the same reason it is possible optionally, or especially with greater load web distance, to add a foil adhesive to obtain on the boundary surfaces between load web and unidirectional fiber cord an elastic layer. A further possibility of preventing delamination effects between the unidirectional fiber cords and the load webs, consists in that the load webs are formed elastically in the direction of load web thickness by being slit longitudinally on their marginal regions which reach into the fiber cords, from the load web respective upper and lower edges.

BRIEF DESCRIPTION OF THE DRAWINGS

The invention will be explained in greater detail in the following detailed description, with reference to the drawings, in which.

DETAILED DESCRIPTION

Figure 1:
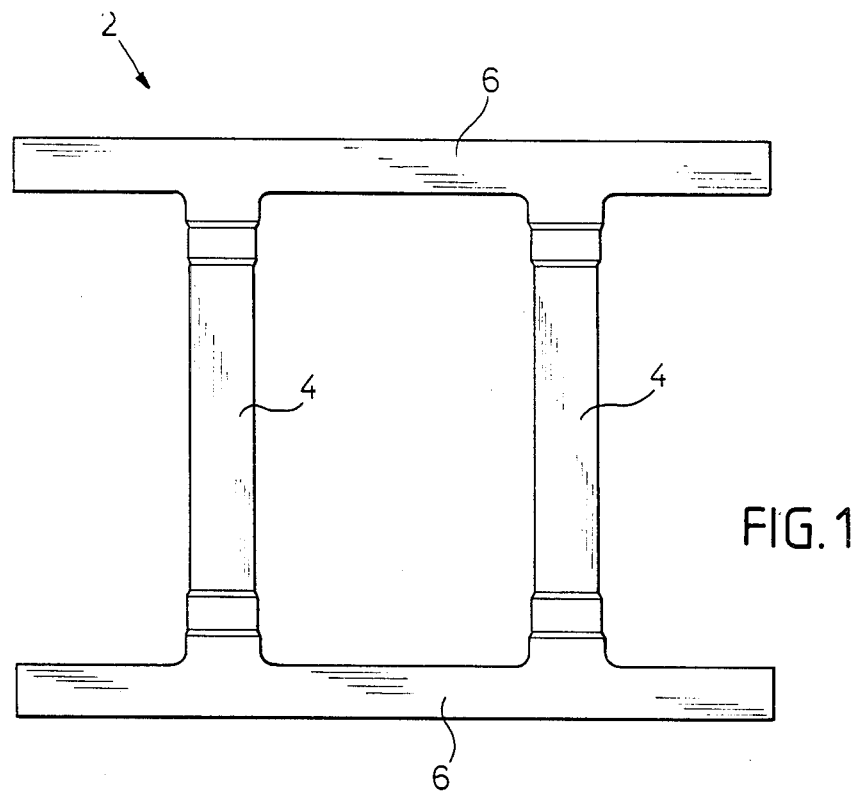
FIG. 1 is an overhead view of a truck or bogie frame of fiber composite construction.
Figure 2:
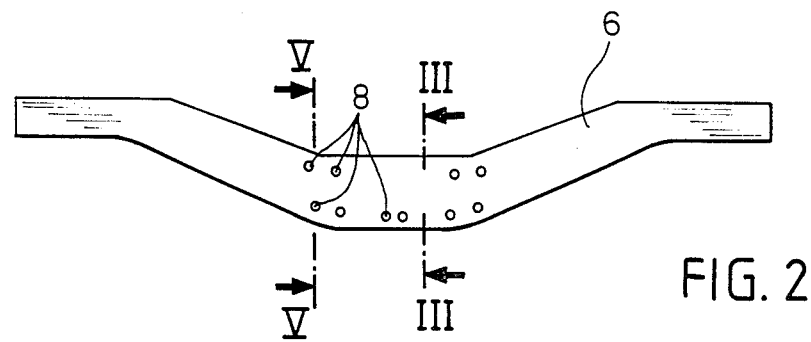
FIG. 2 is a side view of a longitudinal bending load beam of the truck frame according to FIG. 1.
Figure 3:
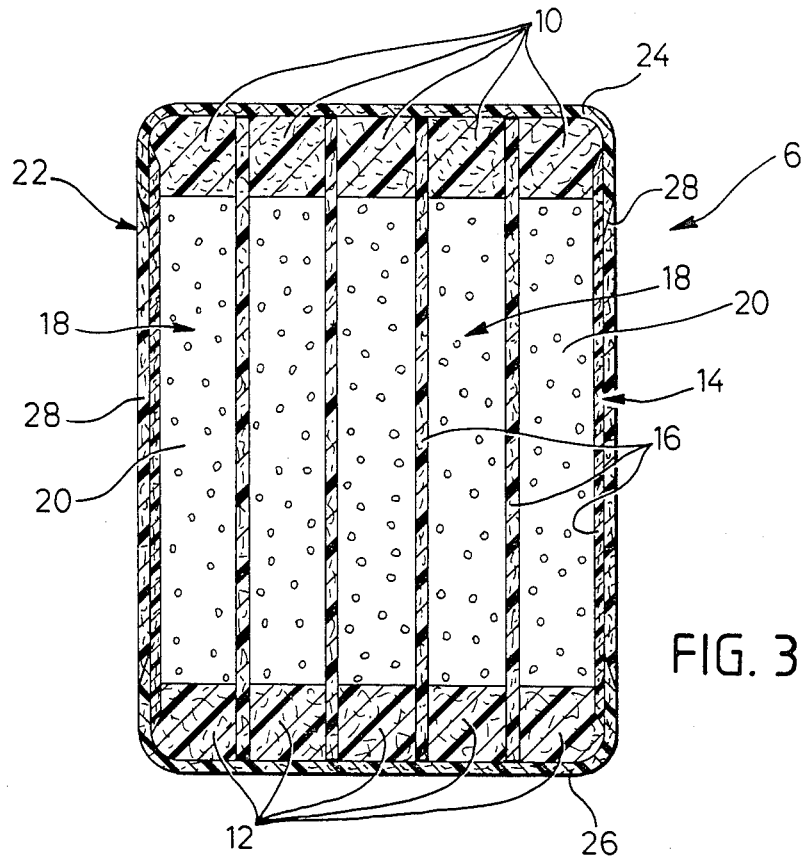
FIG. 3 is a section of the beam along line III—III of FIG. 2.

The truck or bogie frame 2 of fiber composite material shown in FIG. 1 comprises two longitudinal bending load beams 6 connected to each other through cross-members 4, the beams carrying at the ends thereof the wheeltruck axles and being provided in the center with load introduction sites in the form of perforation bores 8 (FIG. 2), on which the loads resulting from the vehicle body support and the linking, for example over (also not shown) metal fittings and tension rods are introduced into the beam 6. The beams 6 assume, in addition to the carrying function, also the function of primary springs, i.e. besides a given strength they must also have a defined rigidity, namely to be torsion resistant to a high degree and, in the plane of the truck frame, rigid. Simultaneously, in the vertical direction, thus, perpendicular to the truck plane, the beams must have an elasticity which changes over the length of the beam 6 in specified ways such, that they are relatively resilient at the beam ends. In the region of the beam center, however, they must be very rigid.

Figure 4:
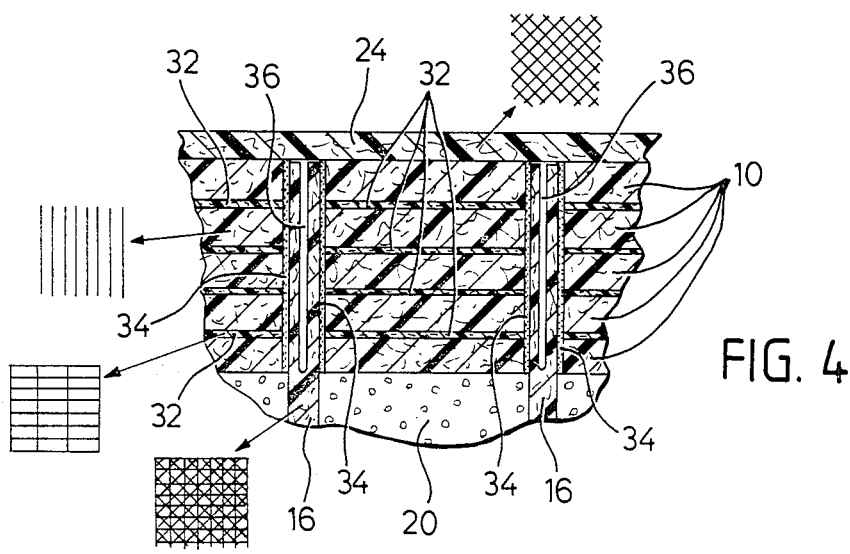
FIG. 4 is an enlarged partial section of FIG. 3 in the area of the upper unidirectional fiber cord.

In order to meet these demands placed on strength and rigidity in a manner which does justice to the fiber composite and saves weight, the beams 6 have the inner structure shown in detail in FIGS. 3 to 6: they contain in each instance an upper and a lower flange 10, 12 in the form of a fiber cord of constant cross section with its fibers oriented unidirectionally over the entire beam length as well as a load web arrangement 14 maintaining distance between the cords, consisting of a large number of lamellae-like individual thin-walled load webs 16 distributed over the width of the beam 6, standing upright, running continuously between the beam ends, the individual load webs having each a quasi-istropic fiber layer structure, thus, having approximately the 0°, 90°, and +45° fiber orientation indicated in FIG. 4 in cross hatching.

The height of the load web arrangement 14 changes in the longitudinal direction of the beam depending on the desired elasticity of the beam, i.e. the individual load webs 16 are of a height decreasing toward the beam ends, with the upper and lower marginal regions of the load webs 16 extending into the unidirectional fiber cords 10, 12 and being luted with them areally, in order to achieve good bonding of the load web arrangement 14 to the fiber cords 10, 12 and effective protection of these fiber cords against bursting open under load. The hollow chambers 18, whose boundaries are the load webs 16, are filled with strips of foamed material 20, for example of high-temperature stable, resistant polyimide foam.

The fiber cords 10, 12 and the load web arrangement 14 are enclosed on the outside by a fiber composite cover coat 22 increasing torsion resistance, comprising upper and lower U-shaped shell parts 24, 26, with the lateral torsion coat parts 28 between them, in which the fibers run at +45° with respect to the longitudinal direction of the beam, as is indicated in FIG. 4 again through the assigned cross hatching.

Figure 5:
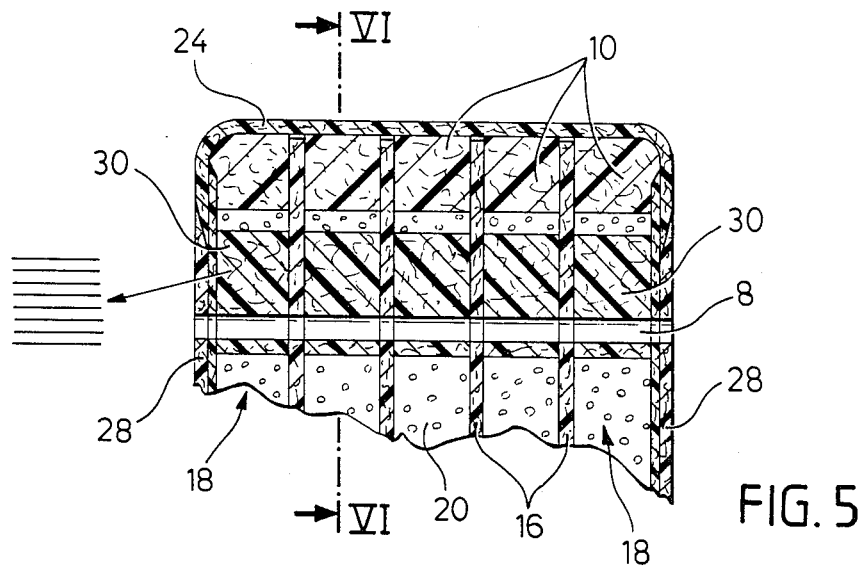
FIG. 5 is a partial section of the beam along line V—V of FIG. 2.
Figure 6:
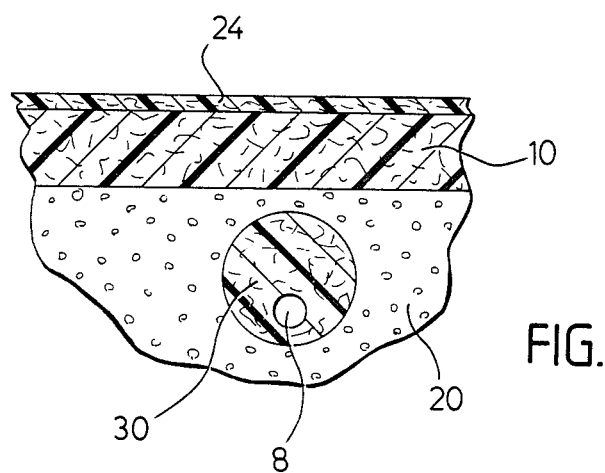
FIG. 6 is a partial section along line VI—VI of FIG. 5.

As FIGS. 5 and 6 show, the load introduction bores 8 are formed in the load webs 16 in the area of the hollow chambers 18, with fiber composite inserts 30 provided for locally reinforcing the load webs 16, which are placed in the hollow chambers 18 and luted on both sides with the associated load webs 16. The fiber orientation of the inserts 30 is selected so that they absorb the pressures which originate when the load introduction fittings are screwed on. To that end the fibers of the inserts 30 are oriented perpendicular to the plane of the load webs 16, as indicated in FIG. 5.

For producing the beams 6, the individual foamed material strips 20 are initially cut to the desired contours and machined with respect to thickness and subsequently provided with recesses at the load introduction sites, into which the previously cured inserts 30, cut to the thickness of the individual foam material strips 20, are inserted. Subsequently, the load webs 16, also previously cured and cut, are luted with the foamed material strips 20 and the inserts 30 located in them. The partial assembly resulting in this way is structured in the manner of a multilayered sandwich structure and forms the fiber composite core of the flexural beam 6, with the upper and lower load web margin areas freely projecting above the fiber composite core.

Between the freely projecting load web margin areas, the upper and lower unidirectional fiber cords 10, 12 are placed still uncured and subsequently the torsion cover 22 also of uncured fiber composite material is applied. After simultaneously curing the fiber cords 10, 12 and the torsion cover 22, the load introduction sites 8 are drilled off center, eccentric to the center axis of the inserts 30, to protect them against twisting during drilling.

According to FIG. 4, fabric strips 32 are inserted into the unidirectional fiber cords 10 (and also 12), which run at regular distances parallel to each other, extending transversely between the load webs 16 and running over the entire length of the fiber cords 10, 12, which are cured together with the fiber cords 10, 12, and whose reinforcement fibers are oriented primarily perpendicular to the plane of the load webs 16, as indicated by the fiber density of the associated cross hatching in FIG. 4, greater in this direction. These fabric strips 32 prevent shrinkage of the resin matrix of the unidirectional fiber cords 10, 12 during the curing cycle perpendicular to the already previously cured load webs 16, maintained at a fixed distance by the foamed material strips 20, and the inserts 30, and good, delamination-free luting over a large area of the load web margin areas with the adjoining portions of the unidirectional fiber cords is ensured. Optionally, or with greater distance between the load webs 16, also additionally, a foil adhesive 34 (FIG. 4) can be inserted for the same purpose between the load web margin area and the adjoining portions of the fiber partial cords, which forms in the direction transverse to the load webs 16 an elastic intermediate layer, which prevents detachments caused by shrinkage during curing, and/or the load webs 16 can be yielding in the direction of load web thickness by being provided with longitudinal slits 36, open on one side toward the load web respective upper and lower edges, placed centrally on their margin areas projecting above the foamed material strips 20, in order to compensate for shrinkage.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A bending load beam, in particular for the truck frame of a rail vehicle, comprising a fiber composite structure, which is at least in the beam center relatively rigid and at the beam end sections elastic, having an upper and a lower fiber cord formed as respective upper and lower flanges, the fiber cords having a fiber direction which is unidirectional in the longitudinal direction of the beam, and having a fiber composite core arranged between the fiber cords so as to maintain a distance between the fiber cords, the fiber composite core comprising a plurality of fiber composite load webs distributed lamellae-like over the beam width, the load webs extending in the longitudinal beam direction and confining hollow chambers therebetween, the fibers of the load webs being oriented obliquely to the longitudinal beam direction, marginal regions of the load webs extending into the upper and the lower fiber cords and being fastened in said fiber cords, the load web marginal regions being connected to the fiber cords through an adhesive bond in the form of a foil adhesive elastic in the direction transverse to the load web.

2. A bending load beam, in particular for the truck frame of a rail vehicle, comprising a fiber composite structure which is relatively rigid at least in the beam center, elastic at the beam end sections and having an upper and lower fiber cord formed as respective upper and lower flanges, the fiber cords having a fiber direction unidirectional in the longitudinal direction of the beam and extending the entire length of the beam, and having a fiber composite core arranged between the fiber cords so as to maintain a distance between the fiber cords, the fiber composite core comprising a plurality of fiber composite load webs distributed lamellae-like over the beam width, the load webs extending in the longitudinal beam direction and confining hollow chambers therebetween and having fibers oriented obliquely to the longitudinal beam direction, marginal regions of the load webs extending into the upper and the lower fiber cords and being fastened in the fiber cords, the fiber cords having fabric strips inserted therein, said strips being parallel to each other and extending transverse to and between the load webs over the lengths of the fiber cords and having fibers oriented essentially perpendicular to the plane of the load webs.

3. A bending load beam, in particular for the truck frame of a rail vehicle, comprising a fiber composite structure which is at least in the beam center relatively rigid and at the beam end sections elastic, having an upper and a lower fiber cord forming respective upper and lower flanges, the fiber cords having a fiber direction which is unidirectional in the longitudinal direction of the beam, and having a fiber composite core arranged between the fiber cords so as to maintain a distance between the fiber cords, the fiber composite core comprising a plurality of fiber composite load webs distributed lamellae-like over the beam width, the load webs extending in the longitudinal beam direction, and confining hollow chambers therebetween and having fibers oriented obliquely to the longitudinal beam direction, marginal regions of the load webs extending into the upper and the lower fiber cords and being fastened in the fiber cords, the marginal regions of the load webs having longitudinal slots disposed centrally within the marginal regions and being open on one end toward the web edge, thereby allowing yielding in the direction of the load web thickness.

4. The beam recited in claim 1, wherein the fibers of the load webs cross each other quasi-isotropically.

5. The beam recited in claim 2, wherein the fibers of the load webs cross each other quasi-isotropically.

6. The beam recited in claim 3, wherein the fibers of the load webs cross each other quasi-isotropically.

7. The beam recited in claim 4, wherein the fibers of the load webs are oriented at 0°, 90°, and +45° with respect to the longitudinal direction of the beam.

8. The beam recited in claim 5, wherein the fibers of the load webs are oriented at 0°, 90°, and +45° with respect to the longitudinal direction of the beam.

9. The beam recited in claim 6, wherein the fibers of the load webs are oriented at 0°, 90°, and +45° with respect to the longitudinal direction of the beam.

10. The beam recited in claim 1, wherein at least some load introduction sites of the beam are provided on the webs between the upper and the lower fiber cords with the load webs being reinforced locally at the load introduction sites through fiber composite inserts bridging the hollow chambers and being luted on the load web sides.

11. The beam recited in claim 2, wherein at least some load introduction sites of the beam are provided on the load webs between the upper and the lower fiber cords with the load webs being reinforced locally at the load introduction sites through fiber composite inserts bridging the hollow chambers and being luted on the load web sides.

12. The beam recited in claim 3, wherein at least some load introduction sites of the beam are provided on the load webs between the upper and the lower fiber cords with the load webs being reinforced locally at the load introduction sites through fiber composite inserts bridging the hollow chambers and being luted on the load web sides.

13. The beam recited in claim 10, wherein the fibers of the inserts are essentially oriented perpendicular to the plane of the load webs.

14. The beam recited in claim 11, wherein the fibers of the inserts are essentially oriented perpendicular to the plane of the load webs.

15. The beam recited in claim 12, wherein the fibers of the inserts are essentially oriented perpendicular to the plane of the load webs.

16. The beam recited in claim 1, wherein the load webs are of a height which changes with the degree of rigidity of the beam and increases toward the center of the beam.

17. The beam recited in claim 2, wherein the load webs are of a height which changes with the degree of rigidity of the beam and increases toward the center of the beam.

18. The beam recited in claim 3, wherein the load webs are of a height which changes with the degree of rigidity of the beam and increases toward the center of the beam.

19. The beam recited in claim 1, wherein the hollow chambers are filled with a filler, in particular with foamed material.

20. The beam recited in claim 2, wherein the hollow chambers are filled with a filler, in particular with foamed material.

21. The beam recited in claim 3, wherein the hollow chambers are filled with a filler, in particular with foamed material.

* * * * *